United States Patent [19]

Asrar

[11] Patent Number: 4,891,414
[45] Date of Patent: Jan. 2, 1990

[54] CYCLOPENTANE DIOL VINYLENE POLYMERS

[75] Inventor: Jawed Asrar, Wilbraham, Mass.

[73] Assignee: Monsanto Company, St. Louis, Mo.

[21] Appl. No.: 300,883

[22] Filed: Jan. 24, 1989

Related U.S. Application Data

[63] Continuation-in-part of Ser. No. 54,656, May 27, 1987, abandoned.

[51] Int. Cl.$^4$ .............................................. C08F 24/00
[52] U.S. Cl. .................................... 526/269; 526/270; 526/281; 526/309; 526/318.43; 526/90
[58] Field of Search ............... 526/269, 270, 281, 309, 526/318.43, 90

Primary Examiner—Joseph L. Schofer
Assistant Examiner—Alex H. Walker
Attorney, Agent, or Firm—Thomas E. Kelley; William J. Farrington; Richard H. Shear

[57] ABSTRACT

Polymers comprising units of norbornene diol vinylene are prepared by hydrolysis of precursor polymer comprising units of norbornene diol ester vinylene or norbornene dioxocarbonyl vinylene in the presence of an alkaline agent.

4 Claims, No Drawings

CYCLOPENTANE DIOL VINYLENE POLYMERS

BACKGROUND OF THE INVENTION

This is a continuation-in-part of application Ser. No. 07/054,656, filed May 27, 1987, now abandoned incorporated herein by reference.

Disclosed herein are polymers comprising cyclopentane diol vinylene units and methods of making and using such polymers.

As used herein the term "norbornene dioxo" derivatives refers to monomers of the structural formula

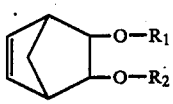

where $R_1$ and $R_2$ are independently hydrogen, an acyl, alkyl or aryl group or are a carbonyl, methylene, or substituted methylene group.

As used herein, the term "dioxo cyclopentane vinylene" refers to polymer units of the structural formula

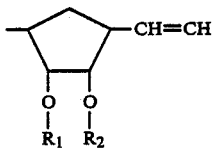

which result from the metathesis ring opening polymerization of norbornene dioxo derivative monomers.

As used herein the term "norbornene dioxocarbonyl" refers to the endo stereoisomeric Diels-Alder adduct of cyclopentadiene and vinylene carbonate which has the structural formula

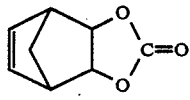

The term "endo" refers to the stereoisomer form of a monomer such as norbornene dioxocarbonyl in which the oxygen atoms and the double bond are both on the same side of the surface of the saturated five-membered ring of the monomer unit. Conversely, the term "exo" refers to the stereoisomeric form of such monomer units in which the oxygen atoms and the double bond are on opposite sides of the surface of the saturated five-membered ring of the monomer unit.

Feast et al. in *Journal of Molecular Catalysis*, 28, (1985) page 293, reported no success in preparing the homopolymer of the endo stereoisomer of norbornene dioxocarbonyl through metathesis ring-opening polymerization. Feast et al. did report limited success in copolymerizing norbornene with low levels (about 8%) of norbornene dioxocarbonyl and also speculated that the exo stereoisomer might be more readily polymerizable than the endo stereoisomer. In this regard it is believed that attempts to produce the exo stereoisomer by high temperature isomerization, e.g. by heating, will be generally unsuccessful with norbornene dioxocarbonyl because during such isomerization the shock-sensitive, e.g. unstable, vinylene carbonate will be generated.

Milner in British Patent Specification No. 1,546,775 claims a variety of norbornene polymers including polymers having monomer units of norbornene diol. However, Milner teaches only the production of the polymer of the mono hydroxyl substituted norbornene by hydrolysis of the mono ester, i.e. polynorbornene acetate.

Ueda et al. in U.S. Pat. No. 4,166,083 state that the polymers of an acetic acid ester of 5-norbornene-2,3-diol can be prepared by methods disclosed by Michelotti et al. *J. Polymer Sci*, 3, 895–905 (1965) which is limited to teaching the polymerization of norbornene and chloromethyl norbornene. Michelotti et al. failed to polymerize norbornene nitrile. Since there is no teaching of a generalized polymerization procedure for norbornene derivatives, Ueda et al. do not provide any enablement for the polymer of the diester of norbornene diol.

McKeon et al. in U.S. Pat. No. 3,330,815 disclose polymers of a variety of bicyclo norbornene derivative monomer units, e.g. 5,6-dihydroxybicyclo[2.2.1]hept-2-ene (referred to herein as norbornene diol) and the diesters. Such polymers are produced through a vinyl-type addition polymerization and not a metathesis ring opening polymerization.

SUMMARY OF THE INVENTION

I have discovered that certain stereoisomer norbornene dioxo derivative monomers can be polymerized by metathesis ring-opening polymerization to provide precursor polymers comprising dioxo cyclopentane vinylene units, e.g. diesters of cyclopentanediol vinylene or cyclopentanedioxocarbonyl vinylene. Polymers comprising units of cyclopentane diol vinylene can be provided through hydrolysis of precursor polymers comprising units of dioxocarbonyl cyclopentane vinylene or, alternatively, through de-esterification of precursor polymers comprising units of diester of cyclopentane diol vinylene. Thus, this invention provides novel polymers comprising units of cyclopentane diol vinylene of the structural formula

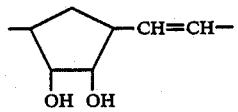

DETAILED DESCRIPTION OF THE INVENTION

Monomeric norbornene dioxocarbonyl can be hydrolyzed to norbornene diol, e.g. by use of a base such as potassium hydroxide. The norbornene diol is not readily polymerizable by metathesis ring opening methods since the hydroxyl groups are deleterious to commonly used catalysts. Norbornene diol can, however, be esterified, e.g. to provide a diester of norbornene diol such as norbornene diacetate. Such diesters of norbornene diol are readily amenable to metathesis ring opening polymerization to provide precursor polymers comprising monomer units of the following structure:

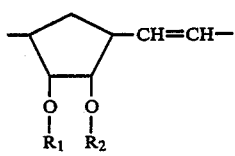

where $R_1$ and $R_2$ are acyl groups, e.g. acetate groups.

Another useful monomer for preparing precursor polymers is the endo stereoisomer norbornene dioxocarbonyl prepared as the Diels-Alder adduct of cyclopentadiene and vinylene carbonate. Norbornene dioxocarbonyl can be polymerized by metathesis ring opening polymerization to provide a precursor polymer having monomer units of the following structure:

Metathesis ring opening polymerization is advantageously carried out at moderate temperatures, e.g. between about 25° C. and about 100° C. in a reaction medium comprising an aprotic solvent, e.g. chlorinated solvent such as dichloroethane, and which is devoid of water, alcohols, and the like which will readily deactivate common polymerization catalysts. Such catalysts are known in the art and are disclosed for instance in U.S. Pat. No. 3,959,234, incorporated herein by reference. A preferred catalyst comprises the reaction product of tungsten hexachloride and an acetal, e.g. 1,1-diethoxy ethane. Preferably, the polymerization reaction medium will also contain as an activator n aluminum alkyl such as diethyl aluminum chloride, triisobutyl aluminum or the like. Higher yields of precursor polymers of higher inherent viscosity have been achieved with triisobutyl aluminum as the activator. The polymerization reaction medium should be kept dry and free of contaminants, e.g. water, alcohols including diols, etc., that may interact with catalyst and/or activator to undesirably reduce the catalytic activity.

Alternatively, metathesis ring-opening polymerization is advantageously carried out as a bulk polymerization process which is especially useful for polymerization of norbornene dioxocarbonyl and diesters of norbornene diol. Bulk polymerization is effectively carried out at moderate temperatures, e.g. between about 25° C. and about 150° C. (depending on the melting temperature of the monomer), utilizing catalysts and activators as described above. Bulk polymerization can be carried out in a mold to form the polymer into a shaped article.

Polymers comprising units of cyclopentane diol vinylene can be provided through hydrolysis of precursor polymers comprising units of cyclopentane dioxocarbonyl vinylene or, alternatively, through de-esterification of precursor polymers comprising monomer units of a diester of cyclopentane diol vinylene. The hydrolysis of such precursor polymers to provide cyclopentane diol groups is readily effected through the use of alkaline agents such as potassium hydroxide. De-esterification of such precursor polymers is similarly readily effected in the presence of an alkaline agent such as potassium hydroxide solution.

The precursor polymers are useful as engineering thermoplastics which can be formed into useful articles by conventional plastic forming techniques such as injection molding or casting from solution. Alternatively, the precursor polymers can be polymerized in bulk directly into molded articles. An advantageous application of this invention is to effect hydrolysis and de-esterification as a surface treatment of preformed articles or films comprising precursor polymer.

The following disclosure is provided to illustrate specific embodiments and aspects of the polymers of this invention but is not intended to imply any limitation of the scope of this invention. Temperatures are reported in degrees Celsius.

EXAMPLE 1

This example serves to illustrate the preparation of norbornene dioxocarbonyl.

12.4 ml of dicyclopentadiene, 52.8 g of vinylene carbonate, and 0.4 g hydroquinone were added to 12.4 ml of toluene in a Parr reactor. The mixture was held at about 160° for about 18 hours. The temperature was reduced to about 45° and the pressure reduced to about 5 mm to remove residual vinylene carbonate. Norbornene dioxocarbonyl was recovered at about 100% yield by raising the solution temperature to about 130°–140° and lowering the pressure to about 2 mm. Norbornene dioxocarbonyl, purified by recrystallization from carbon tetrachloride, exhibited a melting point of 114°–115°.

EXAMPLE 2

This example serves to illustrate the preparation of norbornene diol and norbornene diacetate.

8 g of norbornene dioxocarbonyl, prepared as in Example 1, was dissolved in 120 ml of aqueous sodium hydroxide (12 g NaOH). The solution was refluxed for about 6 hours, held at room temperature for about 16 hours, neutralized with 10% HCl, and then saturated with sodium chloride. Norbornene diol extracted with ethyl ether exhibited a melting point of about 176°–177°.

A solution of 11 grams of norbornene diol (prepared as above) in 100 ml pyridine was cooled by dry ice. 45 ml of acetic anhydride was added to the cooled solution. The solution was held in the dry ice bath for about 30 minutes then allowed to sit at room temperature for about 16 hours, poured into an ice water slurry, extracted with chloroform and washed sequentially with 10% HCl, a saturated sodium bicarbonate solution, a sodium chloride solution, twice with water, then dried over sodium sulfate, and crystallized from a mixture of toluene and hexane to produce about 10 grams of norbornene diacetate.

EXAMPLE 3

This example serves to illustrate the solution polymerization of norbornene dioxocarbonyl.

A metathesis polymerization catalyst was prepared by dissolving 1.7 grams of tungsten hexachloride and 1.0 grams of 1,1-diethoxy ethane in about 8.6 ml of toluene to provide a 0.5M catalyst solution based on tungsten. The catalyst and activator solutions are maintained under nitrogen atmosphere to avoid inactivation, e.g. by water and/or oxygen.

0.19 ml of activator solution comprising 2.05M diethyl aluminum chloride in heptane and about 0.08 ml of the 0.5M catalyst solution were added to a solution of 3.2 g norbornene dioxocarbonyl in 7 ml of 1,2-dichloroethane. The solution was maintained at room temperature for about 24 hours, then combined with methanol to precipitate a polymer, which was recovered by filtration and dried (yield about 0.9 g). The polymer had an inherent viscosity of about 0.33 dl/g (measured on a 0.5 g/dl solution in DMF at 30°).

EXAMPLE 4

This example serves to illustrate the preparation of copolymers by bulk polymerization of norbornene dioxocarbonyl and norbornene nitrile.

2.9 g of norbornene dioxocarbonyl was dissolved in 5 ml of norbornene nitrile, e.g. at about 100°. 0.18 ml of 2.05M diethyl aluminum chloride in heptane and 1.1 ml of 0.05N solution of the adduct tungsten hexachloride and diethoxy ethane in norbornene nitrile were added to the solution of norbornene dioxocarbonyl in norbornene nitrile at 100°. The resultant polymer exhibited an inherent viscosity of 0.8 dl/g (as measured on a 0.5 g/dl solution in DMF at 25°).

EXAMPLE 5

This example serves to illustrate the polymerization of norbornene diacetate.

3 g of endo norbornene diacetate, prepared essentially as indicated in Example 2, was dissolved in 3 ml of 1,2dichloroethane to provide a monomer solution. 0.21 ml of 2.05M diethyl aluminum chloride in heptane and 0.15 ml of 0.5M catalyst solution (according to Example 3) were added to the monomer solution to provide a reaction solution which was maintained at room temperature for about 4 hours. Gelation was observed after about 40 minutes. After 4 hours the gel was dispersed by agitation in 15 ml of dichloroethane. Methanol was added to inactivate the catalyst and precipitate the resultant polymer (yield: about 97% based on monomer) which was dried in a vacuum oven.

EXAMPLE 6

This example serves to illustrate the preparation of polymers of cyclopentane diol vinylene.

Polymer comprising cyclopentane dioxocarbonyl vinylene units prepared essentially as indicated in Example 3 was dissolved in dimethyl sulfoxide to provide a polymer solution. A film (about 0.1 mm) cast from the polymer solution was dried at 60° under vacuum for about 24 hours. The film was then immersed in 1N sodium hydroxide solution for about 16 hours, washed in distilled water to pH 7, and dried under vacuum. IR spectroscopic analysis indicated substantial reduction of carbonyl groups and the appearance of absorption due to substantial increase in hydroxyl groups which is consistent with hydrolysis of norbornene dioxocarbonyl groups to hydroxy groups.

EXAMPLE 7

This example serves to illustrate another method for the preparation of polymers of cyclopentane diol vinylene.

Polymer comprising cyclopentane diacetate vinylene prepared essentially as indicated in Example 5 was dissolved in methylene chloride to provide a polymer solution. A film (about 0.1 mm thick) was cast from the polymer solution, dried, then immersed in 1N sodium hydroxide solution for about 16 hours, washed with distilled water to pH 7, dried under vacuum and subjected to infrared spectroscopic analysis which indicated substantial conversion of diacetate groups to hydroxy groups.

While specific embodiments of the invention have been described, it should be apparent to those skilled in the art that various modifications thereof can be made without departing from the true spirit and scope of the invention. Accordingly, it is intended that the following claims cover all such modifications within the full inventive concept.

What is claimed is:

1. A polymer comprising units of cylcopentane diol vinylene of the formula

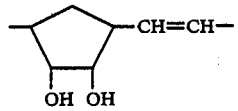

2. A polymer according to claim 1 in the form of an article having cyclopentane diol vinylene units on the surface thereof.

3. A method of preparing polymers comprising cyclopentane diol vinylene units wherein said method comprises hydrolysing precursor polymers which comprise units of dioxocarbonyl cyclopentane vinylene or diesters of cyclopentane diol vinylene.

4. A method according to claim 3 wherein said hydrolysing is effected in the presence of an alkaline agent.